Nov. 13, 1934. C. P. BROCKWAY 1,980,662
ENGINE STARTING MECHANISM
Original Filed May 7, 1921 3 Sheets-Sheet 1
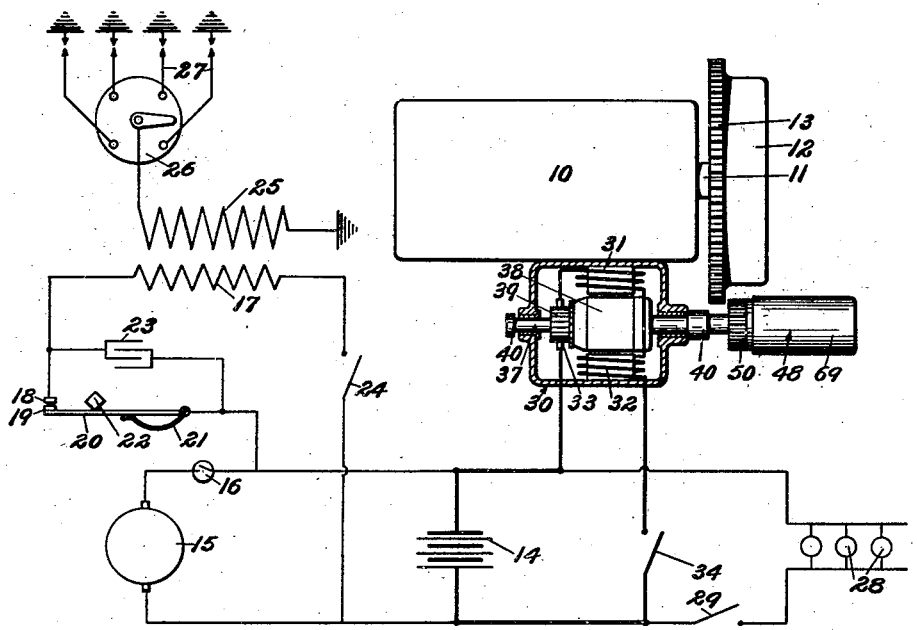
Fig. I.
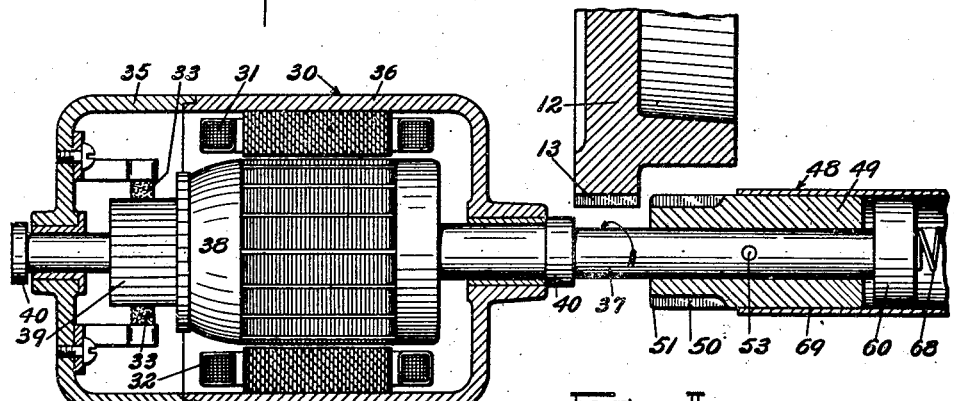
Fig. II.
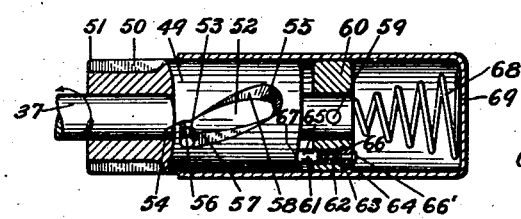
Fig. III.
Inventor
Carl P. Brockway
By Chester H. Braselton
Attorney Nov. 13, 1934.     C. P. BROCKWAY     1,980,662
ENGINE STARTING MECHANISM
Original Filed May 7, 1921     3 Sheets-Sheet 2
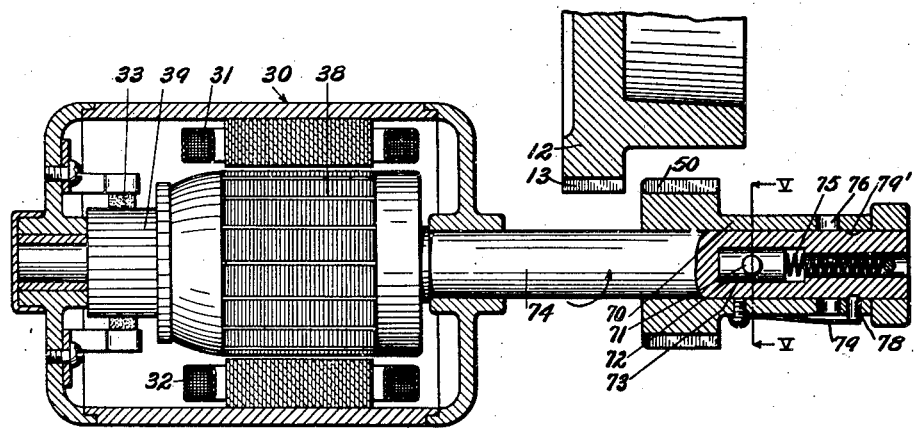
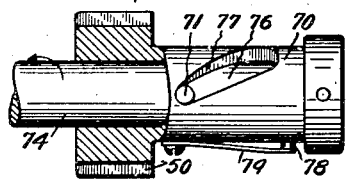
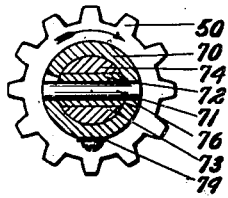
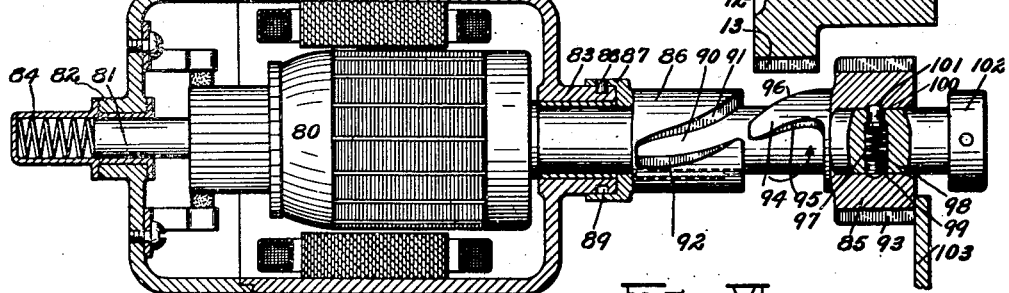
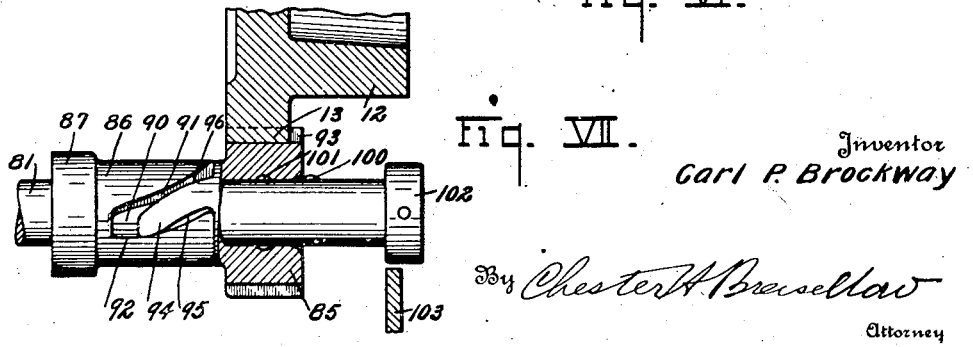
Inventor
Carl P. Brockway
By Chester H. Braselton
Attorney Nov. 13, 1934.     C. P. BROCKWAY     1,980,662
ENGINE STARTING MECHANISM
Original Filed May 7, 1921     3 Sheets-Sheet 3
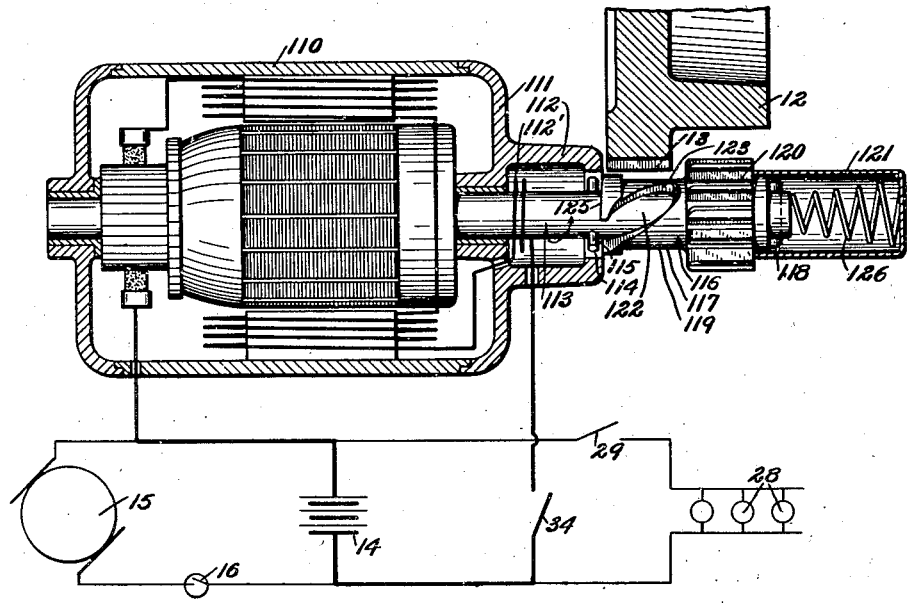
Fig. VIII.
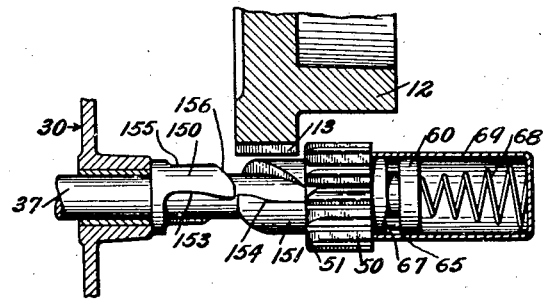
Fig. IX.
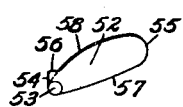
Fig. X.
Inventor
Carl P. Brockway
By Chester H. Braselton
Attorney Patented Nov. 13, 1934

1,980,662

UNITED STATES PATENT OFFICE 1,980,662

ENGINE STARTING MECHANISM

Carl P. Brockway, Paterson, N. J., assignor to Industrial Research Corporation, Toledo, Ohio, a corporation of Delaware Application May 7, 1921, Serial No. 467,635
Renewed October 26, 1932

10 Claims. (Cl. 74—9)

This invention relates to starting mechanism as applied to an internal combustion engine and has specific utility in connection with automobiles.

One of the main objects of the invention is to provide mechanism which transfers power from a motor or power source to an engine or load without the use of intermediary spring connections, the motor and engine being normally disconnected. Another important object is to provide a separable drive which forms a positive drive connection before the motor acquires an appreciable speed thereby greatly decreasing the shock of impact and consequent wear and breakage.

It is an object also to provide a frictional drive connection which is positive in action and not subject to slippage brought about by wear. Still another object is to utilize mechanism combined with the above mentioned elements for normally maintaining the motor and engine gears disconnected. An object also is to provide a completely automatic normally disconnected device which moves into and out of interengagement without manipulation. Another object of the invention is to provide a friction drive having normally disengaged gears which has mechanism inserted for preventing breakage in case the gear teeth do not properly mesh.

Further objects and objects relating to economies of manufacture and details of construction will become apparent as I proceed with the description of that embodiment of my invention which, for the purposes of the present application, is illustrated in the accompanying drawings in which, Figure I shows the drive mechanism associated as an element with the usual electrical gas engine system.

Figure II is a part sectional view of the starting motor and drive mechanism.

Figure III and Figure X are details of the drive pinion;

Figure IV shows a modified drive mechanism;

Figure IVA and Figure V are detail views of the device of Figure IV;

Figure VI is a view of a second modification;

Figure VII is a fragmentary view of the modification of Figure VI showing the drive in operative position;

Figure VIII shows a modified electromagnetic drive arrangement; and

Figure IX illustrates the use of jaw connections in place of the pin and slot connections of Figure III.

Referring particularly to Figure I, I have shown the elements of a conventional electrical system for a multi-cylindered engine 10, whose crankshaft 11 carries a fly-wheel 12, on the periphery of which are cut gear teeth 13.

A storage battery 14 is provided which is adapted to be charged by means of a generator 15 there being a series cut out switch 16 employed, normally operative to close the circuit between the battery and generator when the voltage of the generator exceeds that of the battery.

The ignition circuit includes a primary induction coil 17 connected in series with a fixed contact 18 and a movable contact 19 which latter contact is attached to the pivoted arm 20 and is normally urged toward the fixed contact by means of a spring 21. The interrupting cam 22 is connected to the engine.

In the primary circuit is also a condenser 23 shunted around the contacts 18 and 19, and a manual switch 24 in series with the primary coil and the whole primary circuit is connected to the battery in parallel with the generator. The secondary ignition coil 25 is grounded on the engine through the distributor 26 and the spark plug circuits 27. Illumination is secured through lamps 28, which are connected through switch 29 to the battery.

The starting motor 30 is of the series type having series coils 31 and 32 connected through the main brushes 33 and starting switch 34 to the battery.

A two part casing 35 and 36 forms a practically complete enclosure for the motor, and the ends thereof are apertured to form bearings for the shaft 37 of the armature 38. The brushes 33 are fixed to the casing member 35 and bear on the commutator 39 of the armature. Thrust rings 40 fixed to the shaft are utilized to maintain the armature in proper position, though in some instances the drive ring 40 may be loose to permit axial movement of the armature. At the driving end of the machine the shaft 37 is extended so as to carry readily the drive element 48 and permit of the movement thereof into and out of mesh with the engine flywheel gear 13.

The drive element 48 consists of a cylindrical unit 49, the inner end of which, relative to the motor, is cut into gear teeth 50 adapted to engage the teeth 13 of the engine fly-wheel. In order to facilitate the meshing of the gear teeth the inner ends 51 of the teeth on the drive pinion 50 are rounded as illustrated in the drawings. Opposite sides of the element 48 beyond the pinion proper are formed with cut out portions 52, the edges of which are adapted to form bearing surfaces for the terminals of a pin 53 which passes through and is securely fixed to the armature shaft. The apertures 52 have the appearance of an irregular extended slot the axis of which extends at an angle to the shaft axis, and since it is desired that the pin have similar bearing in each slot the inclination of the slots diverges from the pin when the device is in the position as shown in Figures I and III.

Since the slots are otherwise identical the facing slot 52 of Figure III only will be described.

The inner end 54 of the slot 52 is square, while the outer end 55 is rounded. Similarly, the side edge 56 adjacent the inner slot end and on the side in advance of the pin 53 when rotating is squared while the opposite edge 57 is rounded, the distance between the edges 56 and 57 being appreciably greater than the diameter of the pin 53. The squared edge 56 extends outwardly parallel to the shaft axis to a distance slightly greater than the pin diameter and then merges into the irregularly curved leading edge 58, the pitch of which, relative to the shaft, is minimum nearest the squared inner edge 56 and is maximum or parallel to the shaft near the outer end of the slot. The object of this specific curvature is, as will hereinafter be more fully detailed, to permit a gradual change of the direction of force application from the shaft pin to the pinion.

The inner and rear slot edge 57 is connected to the outer slot end 55 by an inclined edge of uniform pitch, the purpose of this surface being solely to exert axial force on the pinion member 48 to move it along the motor shaft and out of mesh with the engine gear 13.

In addition to the pin and slot connection between the shaft 37 and member 48 above described, a connection between these members is made through the following device. To the end of the motor shaft is fixed by a key 59 or any other suitable means, a collar or ring 60 in which a pin 61 positioned in a hole 62 cut axially in the ring 60, is adapted to have a limited movement. The pin 61 is narrowed at its outer end 63 and has a slidable bearing in an apertured plug 64. At its inner end 65 the pin is enlarged and between the enlarged end 65 and plug 64 a coil spring 66 is positioned so as to tend to move the pin inwardly toward the pinion member 48, the extent of this movement being limited by a head 66' on the pin end.

The inner end of the pin 61 is adapted to have bearing on the outer edge of the pinion member 48, which edge is formed with a notch 67 with broadly slanting sides. When the pin 61 rests in the notch 67, the pin 53 is seated at the inner end of the slot 52, both of these positions corresponding to that of normal disengagement of the starter gears.

A third connection between the motor shaft and pinion member is obtained through a spiral spring 68 of conical formation, the small end of which has a loose bearing on the outer end of the shaft 37 and the outer and large end of which has a bearing on the inner base of a cup casing 69 fixed to the drive member.

It should be noted here that the sides of the casing 69 extend over the drive pinion to such an extent as to enclose the slots 52 and thus keep them free of dirt. Also, the ring 60 has a diameter approximating that of the casing so that sudden outward movement of the ring is resisted both by the air cushioning effect and the spring 68. The specific function of the spring 68 is to maintain the pinion member 48 normally in disengaged position such as is illustrated in Figures I, II, and III.

The operation of the mechanism will now be described. Assuming the motor de-energized and the various drive elements in the positions as illustrated in Figures I, II, and III of the drawings, when the starting switch is closed the armature will rotate in a direction for example, as indicated by the arrow. By virtue of the inertia of the drive element 48 and because of the comparatively low pitch curvature of the outer end edge 67 of the drive member 49, the pin 61 rides on this edge carrying the drive member inwardly. Thereupon the pin 53, taking a path as indicated in dotted line in Figure X, contacts with the irregularly curved edge 58 and moving on this surface forces the drive unit inwardly toward meshing position. As the curvature of edge 58 increases a greater component of force is transmitted rotatively and when the gear teeth are initially engaged at their ends considerable force is being applied to the drive unit to rotate the same. The impact of the teeth of the pinion and fly-wheel tends to force the pin further along the gradually increasing curvature of the edge 58 until, when full enmeshment is secured, the pin is at the outer end of the slot and driving against a surface approximately at right angles to the plane of rotation.

It is thus apparent that the initial drive operation consists in applying the motor force through the pin to a surface whose tangent turns through a wide angle, the force applied varying gradually from a low to a full value co-incident with complete enmeshment of the gear teeth.

It is evident therefore that without the use of springs the detached drive pinion is brought into mesh with its load with a gradual application of force which effectually absorbs the shock incident to this operation. This shock absorption may be further aided by giving the armature slight axial play in its bearings and fixing the collar 40 to the bearings, the shaft being slidable therethrough, thus permitting a pull against the motor field magnetism.

When the engine starts up under its own power the fly-wheel spins the drive unit in advance of the pin which latter, in consequence, bears on the slot surface 57 and cams the drive unit out of mesh with the flywheel.

The spring 68 aids in the disengagement movement and when the drive unit is at its outer extremity prevents remeshing of the gears due to idling, since the strength of the spring is such as to prevent low force movement but insufficient to prevent the initial starting movement.

Should the teeth of the drive pinion 50 in the meshing movement contact with the fly-wheel gear teeth 13 end to end, the pin 61 is unable further to move the drive member 48. However, the motor is still applying force to the shaft which continues its rotation, the spring 66, which under ordinary circumstances is stiff enough to move the drive member, longitudinally yielding to permit the pin end 65 to ride up the cam edge 67. Also the pin 53 moves along the end 54 of the slot 52 until it contacts with the squared surface 56 of the drive member whereupon it causes rotation of this member until the teeth of the same register properly with that of the fly-wheel gear. At this point since the drive member is axially under compression through the spring 66 there is movement of the same into mesh with the fly-wheel and the pin 53, contacting with the slot surface 58 completes the drive operation in the ordinary way.

It should be made clear at this point that the pin 61 working on the cam edge 67 ordinarily forces the drive pinion into initial engagement with the fly-wheel before the pin 53 is positioned so as to avoid the squared edge 56 as otherwise there would be no effective rotation of the drive member in case there were improper enmeshment of the gears. This arrangement provides a simple and very desirable method of preventing teeth jamming in gears of this type and avoids entirely the use of a spring driving connection between the shaft and drive pinion which has heretofore been considered essential.

Figure IV illustrates a modified form of drive unit 70 wherein the pin 71 is fixed within an axially movable block 72, inserted in a transverse co-operating slot 73 in the motor shaft 74.

The block 72 is normally urged to the motor end of its slot by means of a coil spring 75 fitted in a central hollow of the shaft and secured to said shaft at its outer end while bearing at its inner end against the block 72.

In this arrangement the sleeve slot 76 is not squared at the inner end as in the preferred form, but is, on the contrary, rounded to fit the pin 71 so that when the motor shaft is rotated there is a continuous pressure applied to the driving slot edge 77, which pressure has an initial large axial component which decreases progressively to zero following the irregular curvature 77 as described with reference to bearing edge 58 of Figure III.

Because of the insertion of the drive pin 71 in the slidable block 72, the pin and cam elements 61 and 67 of Figure III are not necessary since when the drive pinion and fly-wheel gear teeth meet end to end the pin 71 yields against the spring 75 until the continued shaft rotation brings proper registry of the teeth whereupon the compressed spring operates to force in the drive pinion.

Means for holding the pinion normally at its outer or disengaged position is provided in a pin 78 which is positioned at one end of a leaf spring 79 fixed to the drive element 70 and which is adapted to be normally forced inwardly through a hole in the drive unit to contact with the drive shaft 74. When the drive unit 70 is at its outer limit of movement, the pin seats yieldingly in a groove 79' formed in the drive shaft and thus normally maintains the unit 70 in disengaged position.

The modification of Figure VI differs from the arrangements previously described in that the meshing of the gears is accomplished through direct axial movement of the armature rather than through the inertia of the drive unit.

The armature 80 has a shaft 81 which rests in bearings 82 and 83 in which bearings the shaft has a limited slidable movement, the normal position of the shaft and armature being that limit to which the shaft is urged by the coil spring 84, which latter bears at one end against the commutator end of the shaft and at the other end against the end wall of an enclosing casing fixed to the motor bearing 82. In this position, which is illustrated in Figure VI, the armature core is displaced from its driving position relative to the fields, and the drive unit 85, on the extended driving end of the shaft is in disengaged position relative to the engine gear.

The driving mechanism in this modification is embodied in an intermediate driving member 86 and the main driving member 85.

The intermediate member 86 is splined to the shaft and secured to the motor bearing 83 through a flange 87 which carries a pin 88, the latter being adapted to ride in a groove 89 on the bearing, this form of connection permitting sliding movements only of the shaft relative to the member 86 and rotary movement only of the member 86 relative to the motor.

The member 86 is formed with a plurality of slots 90 which extend from a point adjacent the inner end of the member to and through the outer end. The slot 90 has a general curvature from the inner end to the outer end, in the direction of rotation of the shaft, but the fore and rear edges 91 and 92 have different degrees of curvature. The rear edge 92 at its inner end is approximately normal to the plane of rotation which curvature changes irregularly as the outer end is approached, slowly at first and then more rapidly, approaching a 45 degree angle in the direction of rotation. The fore edge 91, on the contrary has an approximately regular curvature and forms a camming surface for a purpose to be described later.

The main drive pinion 85 is mounted for free movement on the motor shaft, either axial or rotary. This member carries gear teeth 93 adapted to mesh with the fly-wheel teeth 13. On the inner face of the pinion there is fixed a plurality of curved arms 94 which extend inwardly and are inclined oppositely to the direction of rotation. The rear and fore edges 95 and 96 of these arms are adapted to conform with the co-operating edges of the slot 90 previously described.

In order to maintain the drive member 85 in disengaged position a hole 97 is made in the shaft and in this hole is inserted a coil spring 98 which bears against a fixed plug 99 at one end and a movable pin 100 at the other end. The pin 100 is normally urged outwardly by the spring and when the end of the pin registers with the groove 101 formed on the inner surface of the pinion it enters the groove and yieldingly maintains the pinion from axial movement.

When the pin 100 is seated in the pinion groove 101 the pinion is out of engagement with the fly-wheel but not at the outer limit of its movement against the end stop 102, for the reason that a stationary member 103 fixed to the engine or some other stationary support, blocks further outward movement of the pinion while not at the same time preventing movement of the motor shaft.

In describing the operation of this form of drive, it is assumed that the mechanism is positioned as shown in Figure VI. When the motor is energized the field poles draw in the armature against the spring 84 moving the arm 94 toward the intermediate drive member 86. If the arm 94 and slot 90 are in registry the arm enters the slot; otherwise the arm end rides on the outer edge of the member 86 until it reaches the slot.

The arm 94 has such a length that before it is possible for the gear teeth to engage the arm will have entered the slot 90 so that in case the gear teeth fail to mesh properly rotation to the drive pinion 85 may be imparted until the gear teeth mesh. Then the pronounced curvature of the outer edge 92 working on the rear edge 95 of the corresponding arm, tends to cam in the same drawing the gears into complete mesh, the force transmitted to the pinion 85 being progressively increased as the arm terminals approach the flat inner edges of the slot 90.

In order to prevent the pinion 85 from slipping off its holding pin 100 in case the end of arm 94 fails initially to enter the slot 90, the mouth of the slot is ordinarily made wide with the forward edge 91 having a constant incline to the rear of the next slot so that, in conjunction with the rotation of the shaft, there is never the full force of arrested motion applied to the pinion 85. In case, however, the pinion should slip its pin 100, it is necessary only to disconnect the starting switch and restart the mechanism.

When the gear teeth fail to mesh the impact would ordinarily be sufficient to slip the pin 100 out of the groove connection in the pinion, but at this time the inner pull of the slot edge 92 is effective which holds the pinion until the teeth register.

Subsequent to the starting of the engine the accelerated movement of the fly-wheel cams out the pinion through the bearing of arm edge 96 on slot edge 91. This movement carries the pinion to a point adjacent the stop 102, beyond its proper position relative to the pin 100. If the pinion were to remain here remeshing without manual assistance would be impossible because the distance of the pinion from the gear would exceed the movement of the armature shaft. To restore the pinion to proper position therefore the stop 103 becomes necessary, this stop having such a position that when the motor is deenergized and the shaft moves outwardly, the pinion contacts therewith and holds it from further outer movement, the resting point of the shaft being such that the pin 100 and groove 101 are in mutual engagement, and the whole mechanism in readiness for another starting operation.

In Figure VIII is illustrated a modification wherein instead of making the armature shaft movable in the starting operation by electromagnetic means I utilize these means for shifting the drive member only. Referring to this figure there is illustrated a motor 110 in the drive end plate 111 of which an electromagnet 112 is built, the same assuming the form of a cup with its edges secured to the end plate 111 and its base apertured to receive the motor shaft 113. Within the cup 112 is a coil 112′ consisting of a few turns of wire which is connected in series with the series motor 110 and battery 14, the various other electrical units and connections being as previously described in connection with Figure I.

Approximately within the aperture 114 of the electromagnet a pin 115 is fixed to the shaft extending through and protruding from the same, the function of which pin being to engage the drive member 116, the elements of which member will now be described.

A sleeve 117 is placed on the motor shaft between the drive pin 115 and a thrust pin 118, these pins serving to limit axial movement of sleeve on the shaft. There are three parts to the sleeve, a clutch 119, a pinion 120, and a casing 121. The clutch element is on the inner end of the drive and is formed with a plurality of slots 122 inclined toward the motor and opposite to the direction of motor rotation. The fore or bearing edge 123 of the slot has the irregular curvature described with reference to the other modification, the inner end thereof possessing a minimum pitch which progressively changes to a surface parallel to the shaft axis. On the other hand the edge 124 of the slot has a regular camming inclination.

The slot 122 is adapted to operatively engage the pin 115 and in order to facilitate this engagement the inner edge 125 of the clutch is inclined somewhat outwardly from the front slot edge of one slot to the rear slot edge of the next succeeding slot so that the pin will tend to move on the incline toward the slot opening.

The pinion 120 is on the sleeve just beyond the end of the slots; and the casing 121 is secured to the sleeve at the outer side of the pinion.

The purpose of the casing is to provide a support for yielding connection between the end of the shaft and the drive member. Within the casing is a spiral spring 126 which bears at one end on the shaft end and at its other end on the outer end of the casing; the action of the spring being to hold the drive member normally at outer or disengaged position. A second purpose of the casing 121 is to exclude as far as possible from the movable parts, dust and other injurious elements.

The fly wheel 12 is positioned in close proximity to, and on the inner side of the pinion 120.

In the meshing operation, with the device as shown in Figure VIII, energization of the motor simultaneously energizes the coil 112′, whereupon a magnetic circuit is formed through the electromagnet 112, the adjacent portion of the shaft and the extreme inner edge of the clutch member 119. A sucking force is thereby exerted on the clutch in order to decrease the reluctance of the magnetic circuit and thus, with the simultaneous rotation of the shaft permitting registry of the pin 115 and the clutch slots, inner movement of the drive member is secured.

Subsequent to the entry of the pin 115 in the slots, the bearing of the pins on the slot edges serves to complete the meshing operation of the drive pinion 120 and fly wheel gear with a continued increase of torque applied to the clutch until full driving force is being transmitted.

After the engine becomes self operating it spins the pinion 120 so as to cam the same out of mesh through the interaction of the pin 115 and slot edge 124, this movement being of course aided by the spring 126.

In cases where, in the meshing movement, the gear teeth meet end to end, the pin 115 in its rotation contacts squarely on the inner terminal of the slot edge 123 and thereby causes a rotation of the drive pinion sufficient to permit initial gear meshing, whereupon the magnetic action and cams draw in the gears to full engagement.

In Figure IX is illustrated an interlocking clutch arrangement in place of the pin and slot connection of Figure III the clutch element 150 taking the place of the pin 53 and the element 151 taking the place of the slot 52. In this arrangement the driving edge 153 of the shaft clutch member 150 is curved so as to present a leading outer end in the direction of rotation. The co-operating edge 154 of the pinion clutch is curved so as to fit the edge 153 when the two edges are in full engagement. By this clutch edge curvature the power transition described with previous modifications is secured, the shaft torque reaching its maximum values when full engagement of the clutches is accomplished.

The rear edge 155 and the end 156 of the shaft clutch 150 is curved also in the direction of rotation, from the inner to the outer limits, and the pinion clutch also shaped to conform to the shaft clutch, this arrangement giving the essential camming action to the pinion when the fly-wheel gear speeds up. Other components of this modification correspond to the device of Figure III.

I desire to claim as my invention:—
1. In a drive mechanism, the combination of a shaft, a power transmitting element secured to the shaft for rotative movement therewith; a pinion positioned on the shaft and slidable relative thereto and movable to operative and non-operative positions frictional means for normally holding said pinion to said shaft; a separable connection between the pinion and power transmitting element, said connection being effective to move said pinion axially into operative position accompanied by the transmission of progressively increasing force from the shaft, as the shaft is positively accelerated in speed, and to move the pinion axially out of operative position when the pinion speed is positively accelerated, said frictional means adapted to thereafter hold said pinion in non-operative position.

2. In a drive mechanism, the combination of a motor shaft axially and rotatably movable in its bearings; a clutch element splined to the shaft; a pinion loosely mounted on the shaft; a clutch element secured to the pinion and adapted to engage said shaft clutch element; electrical means for moving said shaft and causing interengagement of the clutch elements; and means tending to maintain said clutch elements in disengaged positions.

3. In a drive mechanism, the combination of a drive shaft, a pinion mounted on said shaft and movable thereupon, frictional means for normally holding said pinion to said shaft, disengageable means interposed between the pinion and shaft adapted when in engagement for moving the pinion into complete driving relationship with the shaft when the speed of rotation of the shaft exceeds that of the pinion, and for moving the pinion out of driving relationship with the shaft when the speed of rotation of the pinion exceeds that of the shaft, said means being adapted to transmit power from the shaft to the pinion inflexibly and in increasing amounts said frictional means being operable after said pinion has been moved out of driving relationship with said shaft to retain said pinion in non-driving position.

4. In a starting device, a longitudinally movable power driven shaft, a member to be driven, an element mounted upon said shaft and adapted to be moved into and out of engagement with said member upon longitudinal movement of the shaft; means to connect said element for rotation with said shaft when said element is in engagement with said member and to disconnect said element from said shaft and move said element out of engagement with said member when the speed of said element is accelerated independently of said shaft, and means to maintain said element out of engagement with said member while said shaft is positively driven.

5. In a starting device, a longitudinally movable power driven shaft, a member to be driven, means operable upon longitudinal movement of said shaft to connect said shaft and member to cause said member to be driven thereby; means to automatically disconnect said shaft and member when the speed of said member is accelerated with respect to said shaft; and means to maintain said shaft and member disconnected while said shaft is positively driven.

6. In a starting device, a longitudinally movable motor driven shaft, a wheel to be driven, a clutch member mounted on said shaft for rotation therewith; means operable upon longitudinal movement of said shaft to operatively connect said member and wheel when said motor is operated, means to disconnect said member and wheel when the speed of said wheel is accelerated with respect to said member, and friction means to maintain said connecting means in disconnected position.

7. An engine starter comprising a driving shaft, a member freely mounted for rotary and axial movement on said shaft, an element carried by said shaft coacting with a cam slot carried by said member for establishing a connection between said member and shaft, the cam slot being so shaped that when the shaft rotates with respect to the member, the cam coacts with the projection to move the member axially at an increased velocity until the member is enmeshed with a gear of the engine to be started and when the member overruns the shaft, the projection on the shaft coacts with a surface of the cam slot to produce axial movement of the member at different velocity than when the shaft is rotated with respect to the member.

8. An engine starter comprising a driving shaft, a pinion mounted for rotary and axial movement on said shaft, a projection and a closed cam slot connection between said shaft and pinion, the walls of the cam slot being of different curvature with respect to each other; whereby the axial movement of said pinion on said shaft toward a member of the engine to be driven thereby is of different speed ratio than movement of said pinion away from the engine member.

9. A starter for internal combustion engines, including a driving shaft, a driving member mounted on said shaft for longitudinal movement for engagement with a part of the engine to be started, a pin and closed slot connection between said shaft and driving member, said slot being inclined and its walls being out of parallelism whereby relative rotation of said shaft and member causes longitudinal movement of the member in a variable ratio.

10. A starter for internal combustion engines, including a driving shaft, a driving member mounted on said shaft for longitudinal movement for engagement with a part of the engine to be started, a pin and closed slot connection between said shaft and driving member, said slot being inclined and its walls being out of parallelism whereby relative rotation of said shaft and member causes longitudinal movement of the member in a variable ratio, and resilient means to hold the pinion in one position with respect to the slot.

CARL P. BROCKWAY.